United States Patent [19]
Shinozaki et al.

[11] Patent Number: 5,493,662
[45] Date of Patent: Feb. 20, 1996

[54] APPARATUS FOR ENABLING EXCHANGE OF DATA OF DIFFERENT LENGTHS BETWEEN MEMORIES OF AT LEAST TWO COMPUTER SYSTEMS

[75] Inventors: Takashi Shinozaki; Tohru Takahashi, both of Tokyo, Japan

[73] Assignee: NEC Corporation, Tokyo, Japan

[21] Appl. No.: 395,487

[22] Filed: Feb. 27, 1995

Related U.S. Application Data

[63] Continuation of Ser. No. 747,372, Aug. 20, 1991, abandoned.

[30]    Foreign Application Priority Data

Aug. 20, 1990   [JP]   Japan ................................. 2-218745

[51] Int. Cl.⁶ ............................. G06F 12/06; G06F 12/08; G06F 13/00
[52] U.S. Cl. ................. 395/421.02; 395/421.10; 395/445
[58] Field of Search .................... 395/400, 425, 395/445, 497.02, 421.02, 421.08, 421.10

[56]              References Cited

U.S. PATENT DOCUMENTS 3,735,355  5/1973  Balogh, Jr. et al. ............. 340/172.5
4,481,573  11/1984 Fukunaga et al. ..................... 364/200
4,520,441  5/1985  Bandoh et al. ........................ 364/200
5,072,378  12/1991 Manka ..................................... 395/575
5,113,515  5/1992  Fite et al. ............................... 395/425
5,133,058  7/1992  Jensen .................................... 395/400

*Primary Examiner*—Michael A. Whitfield
*Attorney, Agent, or Firm*—Foley & Lardner

[57]              ABSTRACT

In an apparatus for use in a computer system for accessing to a main memory when a desired datum is not memorized in a cache memory, a supplementary memory is included in the apparatus for memorizing a supplementary datum representative of a predetermined address in the main memory. When the desired datum is not memorized in a particular address of the cache memory, a judging circuit produces a particular signal. By a combination of the supplementary datum and the particular signal, an access control part accesses to the main memory to read a specific datum of the main data as the desired datum from the main memory. The specific datum is stored in the particular address from the access control part. The described system can be used for both tagged and untagged data, allowing for compatibility between data systems using different tagging schemes.

3 Claims, 4 Drawing Sheets 5,493,662

APPARATUS FOR ENABLING EXCHANGE OF DATA OF DIFFERENT LENGTHS BETWEEN MEMORIES OF AT LEAST TWO COMPUTER SYSTEMS

This application is a continuation of application Ser. No. 07/747,372, filed Aug. 20, 1991, now abandoned.

BACKGROUND OF THE INVENTION

This invention relates to a computer system comprising a main memory for memorizing main data and a cache memory for memorizing selected data of the main data. More particularly, this invention relates to an apparatus used in the computer system for carrying out an operation for accessing to the main memory when a desired datum of the main data is not memorized as one of the selected data in a particular address of the cache memory.

Such a computer system comprises a processing unit connected to the cache memory. When it is required to read the desired datum, the processing unit produces a cache access signal. Responsive to the cache access signal, the cache memory sends the desired datum to the processing unit when the desired datum is memorized in the cache memory.

When the desired datum is not memorized in the cache memory, the cache access signal is modified into an actual address signal representative of an actual address of the main memory. The actual address signal serves to access to the main memory.

An architecture computer system is known in the art. The architecture computer system is classified into a first and a second type. In the first type, each main datum comprises only a data part and has a first data length. In the second type, each maid datum comprises the data part and a tag part and has a second data length. The system of the second type is generally called a tagged architecture computer system.

In a particular case where the data part in the first type has a predetermined length which is equal to that of the data part in the second type, it is a matter of course that the first and the second data lengths are different from one another. Therefore, consistency can be obtained between the first and the second types in the particular case. More particularly, it is impossible to exchange the main data between the first and the second types. In other words, the computer system of the second type can not use a main memory of the computer system of the first type.

SUMMARY OF THE INVENTION

It is therefore an object of this invention to provide an apparatus which enables exchange of main data between a plurality of computer systems even when each main datum has different lengths between the computer systems.

It is another object of this invention to provide an apparatus which enables exchange of the main data between a cache memory of a first computer system and a main memory of a second computer system in which each main datum has a data length shorter than a corresponding data length used in the first computer system.

Other objects of this invention will become clear as the description proceeds.

According to this invention, there is provided an apparatus for use in combination with a main memory for memorizing main data and a cache memory for memorizing selected data of the main data. The apparatus comprises judging means connected to the cache memory for judging whether or not a desired data of the main data is memorized as one of the selected data in a particular address of the cache memory. The judging means passes the cache access signal to an access control part when the desired data of the main data is not memorized in the particular address of the cache memory. The apparatus further comprises a supplementary memory for memorizing a supplementary datum representative of a predetermined address in the main memory, accessing means connected to the supplementary memory, the judging means, and the main memory for accessing to the main memory by a combination of the supplementary datum and the cache access signal to read a specific data of the main data as the desired data from the main memory, and storing means connected to the accessing means and the cache memory for storing the specific data of the main data from the accessing means in the particular address.

DESCRIPTION OF THE PREFERRED EMBODIMENT

Figure 1:
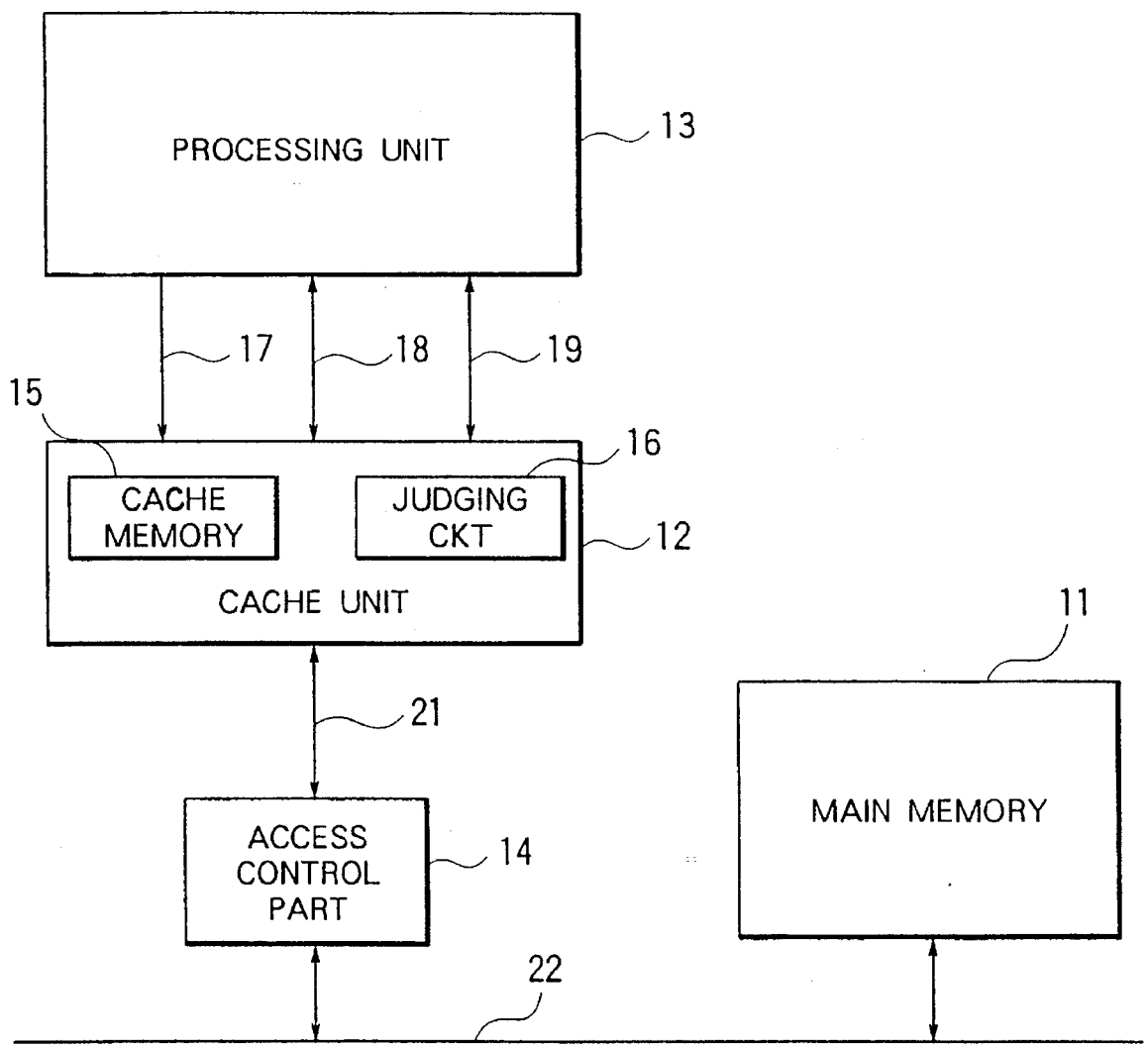
FIG. 1 is a block diagram of a system which comprises an apparatus according to an embodiment of this invention.

Referring to FIG. 1, description will be made as regards a tagged architecture computer system which comprises an apparatus according to a preferred embodiment of this invention. The system comprises a main memory 11, a cache unit 12, a processing unit 13, and an access control part 14. The main memory 11 is fur memorizing main data in the manner known in the art. The cache unit 12 comprises a cache memory 15 and a judging circuit 16. The cache memory 15 is for memorizing selected data of the main data in the manner known in the art. The judging circuit 16 will later be described.

The processing unit 13 is connected to the cache memory 15 through each of address, tag, and data buses 17, 18, and 19. When it is required to read a desired datum of the main data, the processing unit 13 produces a cache access signal. The cache access signal is supplied to the cache memory 15 through the address bus 17 for accessing to a particular one of cache addresses of the cache memory 15 to read the desired datum from the cache memory 15. Each of the tag and the data buses 18 and 19 serves to write the main data in the main memory 11 in the manner known in the art.

The judging circuit 16 is connected to the cache memory 15 and is for judging whether or not the desired datum is memorized as one of the selected data in the particular address. When memorized in the particular address, the desired datum is sent from the cache memory 15 back to the processing unit 13 through the tag and the data buses 18 and 19 in the manner known in the art. Otherwise, the judging circuit 16 sends the cache access signal to the access control part 14.

The access control part 14 is connected to each of the cache memory 15 and the judging circuit 16 through a transfer bus 21 and is for producing a main memory access signal in the manner which will later be described in detail. The main memory access signal is representative of a specific address of the main memory 11.

The access control part 14 is further connected to the main memory 11 through a main memory bus 22 and accesses to the main memory 11 by the use of the main memory access signal to read a specific datum of the main data as the desired datum from the main memory 11. The specific datum is sent from the main memory 11 to the particular address of the cache memory 15 through the main memory bus 22, the access control part 14, and the transfer bus 21.

In the manner known in the art, each of the main data comprises a primary datum and a secondary datum. The primary datum will hereinafter be simply called a data part. The secondary datum will hereinafter be called a tag part. In the system, it is to be noted that the tag part is representative of one of a plurality of In the example being illustrated, the address bus kinds into which the data part is classified.

In the example being illustrated, the address bus 17 has an address bus width of thirty-two bits. The tag bus 18 has a tag bus width of eight bits. The data bus 19 has a data bus width of thirty-two bits.

Figure 2:
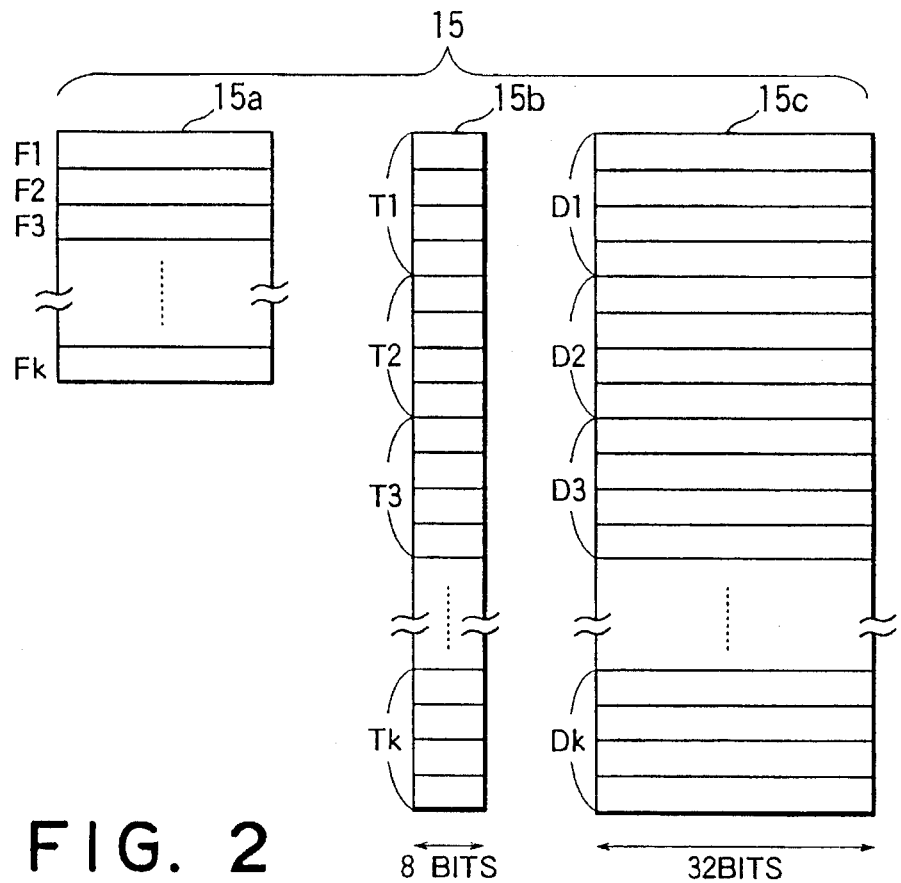
FIG. 2 shows a plurality of memory areas in a cache memory included in the system illustrated in FIG. 1.

Referring to FIG. 2, the description will be directed to a plurality of memory areas of the cache memory 15. The cache memory 15 comprises address, and data arrays 15a, 15b, and 15c. The address array 15a is divided into first through k-th address files F1 through Fk for memorizing the cache addresses. Each of the address files F1 through Fk has a block size of three bytes.

The tag array 15b comprises first through k-th tag blocks T1 through Tk. Each of the tag blocks T1 through Tk has a block size of four bytes. Each of the tag blocks T1 through Tk is divided into a plurality of memory areas, each for memorizing the tag part.

The data array 15c comprises first through k-th data blocks D1 through Dk. Each of the data blocks has a block size of sixteen bytes. Each of the data blocks D1 through Dk is divided into a plurality of memory areas, each for memorizing the data part.

For i between 1 and k, the i-th address file memorizes an address which indicates each of the i-th tag and the i-th data blocks.

Figure 3:
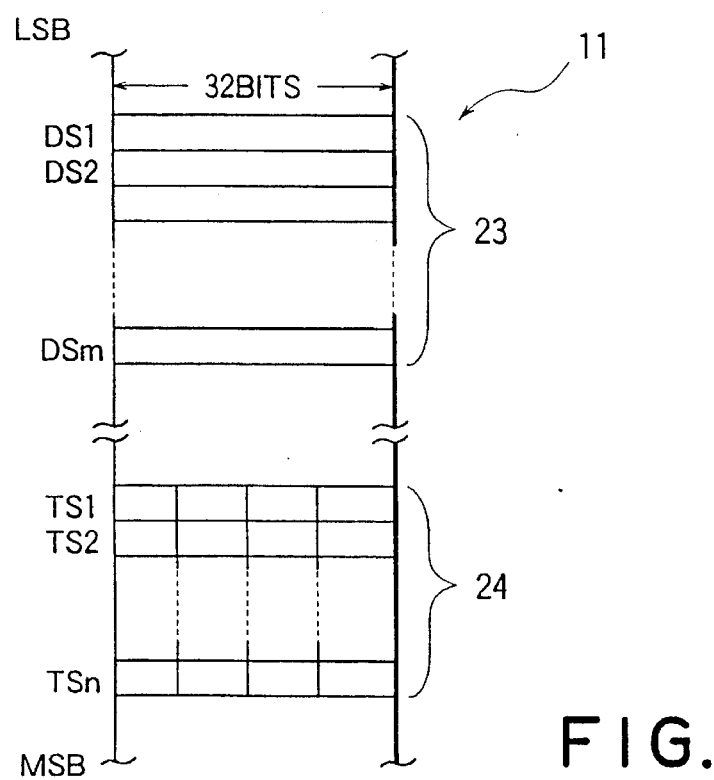
FIG. 3 shows a plurality of memory areas in a main memory included in the system illustrated in FIG. 1.

Referring to FIG. 3, the description will be directed to a plurality of memory areas in the main memory 11. The main memory 11 comprises data and tag areas 23 and 24 which are separated from one another. The data area 23 is divided into first through m-th data sections DS1 through DSm. Each of the data sections DS (suffixes omitted) has a memory capacity for a data segment of thirty-two bits. Therefore, each data block of sixteen bytes can be memorized in a combination of four of the data sections DS. The first data section DS1 has a data base address which will be referred to as a first address.

The tag area 24 is divided into first through n-th tag sections TS1 through TSn. Each of the tag sections TS (suffixed omitted) has a memory capacity of thirty-two bits and is for memorizing a tag block of four bytes. The first tag section TS1 has a tag base address which will be referred to as a second address.

In the example being illustrated, the main memory 11 comprises data sections DS and tag sections TS between two memory sections for a least and a most significant bit which are labelled LSB and MSB, respectively.

Figure 4:
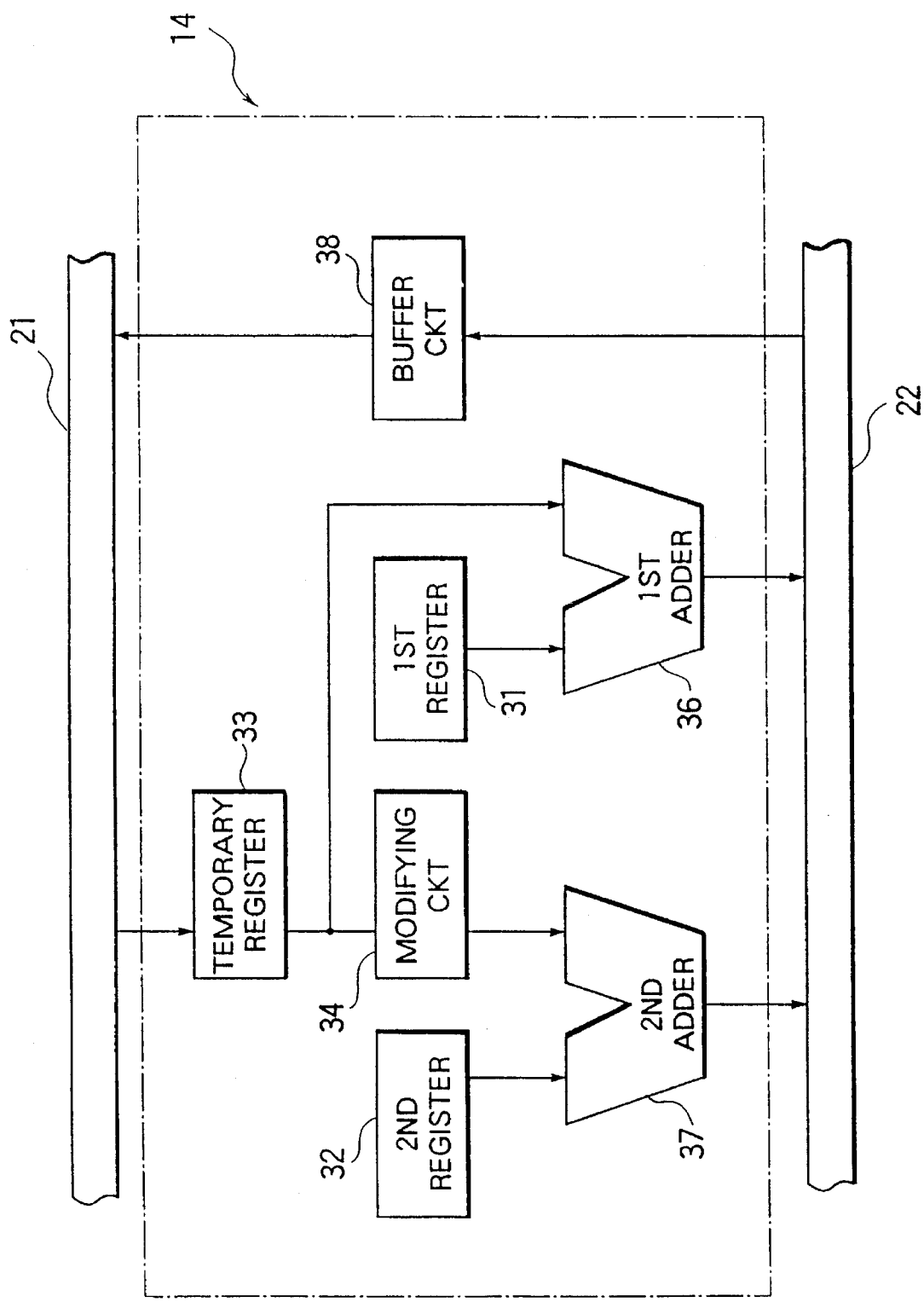
FIG. 4 is a block diagram of an access control part included in the system illustrated in FIG. 1.

Referring to FIG. 4 in addition to FIG. 1, the description will be made as regards the access control part 14 in detail. The access control part 14 comprises a first register 31, a second register 32, a temporary register 33, a modifying circuit 34, a first adder 36, and a second adder 37.

The register 31 is for memorizing a first data base address. The data base address is represented by a first combination of thirty-two bits. The second register 32 is for memorizing a tag base address. The tag base address is represented by a second combination of thirty-two bits. A combination of the first and the second registers 31 and 32 is referred to as a supplementary memory.

The temporary register 33 is connected to the transfer bus 21 and is for temporarily memorizing the cache access signal. The cache access signal is represented by a particular combination of thirty-two bits. The modifying circuit 34 is connected to the temporary register 33 and is for modifying the cache access signal into a modified signal which is different from the cache access signal in a number of bits. More particularly, the modifying circuit 34 deletes two lower bits from the cache access signal. As a result, the modified signal represents a modified address which has a precision of a quarter of that cache access signal.

The first adder 36 is connected to the first register 31, the temporary register 33, and the main memory bus 22. Responsive to the data base address and the cache access signal, the first adder 36 adds the cache access signal to the data base address to produce a first address signal. The first adder 36 will be referred to as a first calculating arrangement, A combination of the temporary register 33 and the first adder 36 will be referred to as a first processing arrangement.

The second adder 37 is connected to the second register 32, the modifying circuit 34, and the main memory bus 22. Responsive to the tag base address and the modified signal, the second adder 37 adds the modified signal to the tag base address to produce a second address signal. The second adder 37 will be referred to as a second calculation arrangement. A combination of the temporary register 33, the modifying circuit 34, and the second adder 37 will be referred to us a second processing arrangement. A combination of the first and the second processing arrangements will be referred to as a processing arrangement. A combination of the first address signal and the second address signal is referred to as the main memory access signal.

Responsive to the second address signal, the second adder 37 accesses to the tag area 24 of the main memory 11 through the main memory bus 22 to read a specific tag of the tag parts from the main memory 11. In this event, the specific tag of four bytes are read through the main memory bus 22.

After operation is finished about access of the tag area 24, the first adder 36 accesses to the data area 23 of the main memory 11 through the main memory bus 22 to read a specific one of the data parts from the main memory 11. In this event, the access operation is repeatedly carried out four times by the main memory bus 22 with one added to two lower bits each of the four times. This is because the first adder 36 accesses only four bytes of the specific data by the access operation at once. A combination of the first and the second adders 36 and 37 will be referred to as a reading arrangement. A combination of the reading and the processing arrangements is referred to as an accessing arrangement.

The access control part 14 further comprises a buffer circuit 38 known in the art. The specific tag and the specific data parts are collectively stored as the specific datum from the main memory 11 in the particular address of the cache memory 15 through the main memory bus 22, the buffer circuit 38, and the transfer bus 21. A combination of the main memory bus 22, the buffer circuit 38, and the transfer bus 21 is referred to as a storing arrangement.

Figure 5:
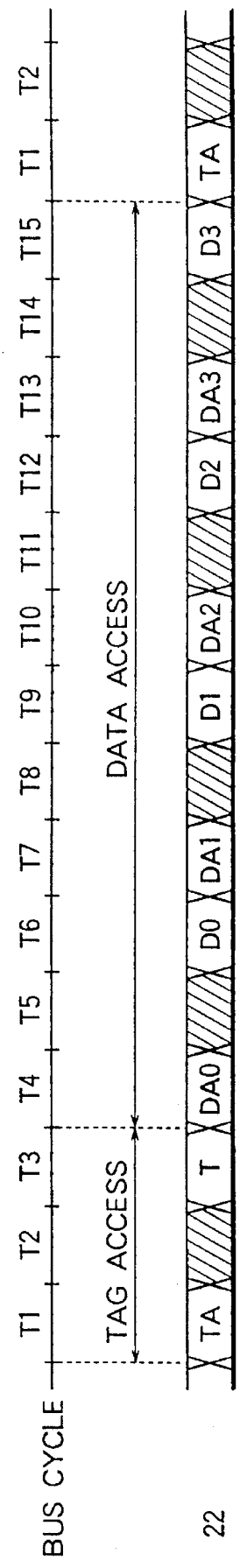
FIG. 5 is a time chart for use in describing operation of a main memory bus included in the system illustrated in FIG. 1.

Referring to FIG. 5, the description will be made as regards operation of the main memory bus 22. The operation of the main memory bus 22 is controlled in accordance with each of successive bus cycles which comprises first through fifteenth time intervals T1 through T15. In the first time interval T1, a tag address signal TA is sent from the second adder 37 to the main memory 11 through the main memory bus 22. In the third time interval T3, a tag part is sent from the tag area 24 of the main memory 11 through the main memory bus 22 in response to the tag address signal TA. In this manner, the tag part is accessed during the first through the third time intervals T1 through T3 in each of the bus cycles. The tag part is indicated by a reference symbol T.

In the fourth, the seventh, the tenth, and the thirteenth time intervals T4, T7, T10, and T13, data address signals DA0, DA1, DA2, and DA3 are sent from the access control part 14 to the main memory 11 through the main memory bus 22. In the sixth, the ninth, the twelfth, and the fifteenth time intervals T6, T9, T12, and T15, data segments D0, D1, D2, and D3 are sent from four of the data sections DS of the main memory 11 through the main memory bus 22. A combination of the data segments D0, D1, D2, and D3 represents the data part. In this manner, the data part is accessed during the fourth through the fifteenth time intervals T4 through T15 in each of the bus cycles. Each of the remaining time intervals is invalid.

What is claimed is:

1. An apparatus for use in combination with a main memory for memorizing main data and a cache memory for memorizing selected data of said main data, said apparatus comprising:

judging means connected to said cache memory for judging whether or not a desired data of said main data is memorized as one of said selected data in a particular address of said cache memory, said judging means passing a cache access signal when said desired data is not memorized in said particular address;

a supplementary memory including a first register for memorizing a data base address representative of a first address in said main memory and a second register for memorizing a tag base address representative of a second address in said main memory, accessing means connected to said supplementary memory, said judging means, and said main memory for accessing said main memory in accordance with said data base address, said tag base address and said cache access signal to read from said main memory a data part of said main data and a tag part of said main data collectively as a specific data of said main data being said desired data; and storing means connected to said accessing means and said cache memory for storing said specific data from said accessing means in said particular address;

wherein said accessing means comprises:

processing means connected to said first register, said second register, and said judging means for processing said data base address and said tag base address with reference to said cache access signal into a first and a second address signal, respectively; and reading means connected to said processing means and said main memory for reading said data part and said tag part from said main memory in accordance with said first and second address signals.

2. An apparatus as claimed in claim 1, wherein said processing means comprises:

first processing means connected to said first register and said judging means for processing said data base address with reference to said cache access signal into said first address signal; and second processing means connected to said second register and said judging means for processing said tag base address with reference to said cache access signal into said second address signal.

3. An apparatus as claimed in claim 2, wherein said cache access signal is represented by a particular combination of bits, said data base address being represented by a first combination of bits, said tag base address being represented by a second combination of bits, and wherein said first processing means comprises:

modifying means connected to said judging means for modifying said particular combination into a modified combination different from said particular combination by modifying a number of bits of said particular combination; and first calculating means connected to said modifying means, said first register, and said reading means for carrying out a first predetermined calculation between said modified combination and said first combination to produce, as said first address signal, a first result signal representative of a result of said first calculation, said second processing means comprising second calculating means connected to said judging means, said second register, and said reading means for carrying out a second predetermined calculation between said particular combination and said second combination to produce, as said second address signal, a second result signal representative of a result of said second calculation.

* * * * *